(12) United States Patent
Sun et al.

(10) Patent No.: US 11,379,055 B2
(45) Date of Patent: Jul. 5, 2022

(54) ACTIVE PEN, TOUCH INPUT SYSTEM, METHOD FOR DRIVING ACTIVE PEN, AND METHOD FOR DRIVING TOUCH INPUT SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wei Sun, Beijing (CN); Dong Chen, Beijing (CN); Wenchao Han, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 385 days.

(21) Appl. No.: 16/609,838

(22) PCT Filed: Jun. 13, 2019

(86) PCT No.: PCT/CN2019/091115
§ 371 (c)(1),
(2) Date: Oct. 31, 2019

(87) PCT Pub. No.: WO2020/001283
PCT Pub. Date: Jan. 2, 2020

(65) Prior Publication Data
US 2021/0357043 A1  Nov. 18, 2021

(30) Foreign Application Priority Data
Jun. 28, 2018  (CN) .......................... 201810691844.3

(51) Int. Cl.
*G06F 3/0354* (2013.01)
*G06F 3/044* (2006.01)
*G06F 3/038* (2013.01)

(52) U.S. Cl.
CPC ........ *G06F 3/03545* (2013.01); *G06F 3/0383* (2013.01); *G06F 3/0442* (2019.05); *G06F 3/0446* (2019.05)

(58) Field of Classification Search
CPC .. G06F 3/03545; G06F 3/0383; G06F 3/0442; G06F 3/0446
See application file for complete search history.

(56) References Cited

U.S. PATENT DOCUMENTS 9,851,833 B2 * 12/2017 Kwon .................... G06F 3/0416
2008/0055267 A1 * 3/2008 Wu ........................ G06F 3/0412
345/173

(Continued)

FOREIGN PATENT DOCUMENTS

CN  103645813 A  3/2014
CN  104111741 A  10/2014

(Continued)

OTHER PUBLICATIONS

Office Action Issued for Chinese Application No. 201810691844.3 dated May 28, 2020, 22 pages.

*Primary Examiner* — Michael Pervan
(74) *Attorney, Agent, or Firm* — Dave Law Group LLC; Raj S. Dave

(57) ABSTRACT

An active pen for a touch display screen, a touch input system, a method for driving an active pen, and a method for driving a touch input system are provided. The active pen includes: a signal receiving device, a processor which is in signal connection with the signal receiving device, and a signal transmitting device which is in signal connection with the processor. The signal receiving device is configured to (Continued)

receive a first coupling voltage between the active pen and the touch display screen. The processor is configured to process the first coupling voltage to obtain a second coupling voltage, and a polarity of the second coupling voltage is opposite to a polarity of the first coupling voltage. The signal transmitting deice is configured to transmit the second coupling voltage to the touch display screen.

20 Claims, 4 Drawing Sheets

(56) References Cited

U.S. PATENT DOCUMENTS

| | | | |
|---|---|---|---|
| 2012/0062521 | A1 | 3/2012 | Ahn et al. |
| 2014/0306923 | A1 | 10/2014 | Brillant et al. |
| 2017/0131798 | A1* | 5/2017 | Geaghan ............. G06F 3/04162 |
| 2017/0315631 | A1* | 11/2017 | Pourbigharaz ........ G06F 3/0383 |
| 2017/0322645 | A1* | 11/2017 | Kao ................... G06F 3/04182 |

FOREIGN PATENT DOCUMENTS

| | | | |
|---|---|---|---|
| CN | 104111764 | A | 10/2014 |
| CN | 104345920 | A | 2/2015 |
| CN | 104484063 | A | 4/2015 |
| CN | 104484064 | A | 4/2015 |
| CN | 106095174 | A | 11/2016 |
| CN | 205845033 | U | 12/2016 |

\* cited by examiner

ACTIVE PEN, TOUCH INPUT SYSTEM, METHOD FOR DRIVING ACTIVE PEN, AND METHOD FOR DRIVING TOUCH INPUT SYSTEM

CROSS-REFERENCE

The present application is the U.S. national stage of International Patent Application No. PCT/CN2019/091115, filed on Jun. 13, 2019, which claims priority to Chinese patent application No. 2011810691844.3, filed on Jun. 28, 2018, the entire disclosures of which are incorporated herein by reference as part of the present application.

TECHNICAL FIELD

Embodiments of the present disclosure relate to an active pen for a touch display screen, a touch input system, a method for driving an active pen, and a method for driving a touch input system.

BACKGROUND

With the development of touch technologies, more and more mobile terminals use the touch technologies to perform human-computer interaction. In addition to be directly contacted by using fingers to perform touch operations, touch display screens can also perform touch operations by using a touch pen, such as perform graphic design and the like. The touch pen comprises two types, i.e., a passive pen and an active pen. Compared with the passive pen, a nib of the active pen can be designed smaller, which can improve the precision of the touch operation performed by the user, thereby meeting the diversified requirements of the user.

SUMMARY

At least one embodiment of the present disclosure provides an active pen for a touch display screen, which includes: a signal receiving device, a processor, in signal connection with the signal receiving device, and a signal transmitting device, in signal connection with the processor. The signal receiving device is configured to receive a first coupling voltage between the active pen and the touch display screen; the processor is configured to process the first coupling voltage to obtain a second coupling voltage, and a polarity of the second coupling voltage is opposite to a polarity of the first coupling voltage; and the signal transmitting device is configured to transmit the second coupling voltage to the touch display screen.

For example, the active pen provided by an embodiment of the present disclosure further includes a signal amplifying device, and the signal amplifying device is in signal connection with the processor and the signal transmitting device, and is configured to amplify the second coupling voltage and provide the second coupling voltage, which is amplified, to the signal transmitting device.

For example, the active pen provided by an embodiment of the present disclosure further includes a nib which is conductive, and the nib is configured to transmit the first coupling voltage and the second coupling voltage.

For example, the active pen provided by an embodiment of the present disclosure further includes a power supply and a switch device; the switch device is configured to turn on or turn off the power supply, so that the active pen switches between an active mode and a passive mode; the power supply is configured to provide electric energy to the active pen; in a case where the switch device turns on the power supply so that the power supply provides the electric energy, the active pen is in the active mode; and in a case where the switch device turns off the power supply so that the power supply does not provide the electric energy, the active pen is in the passive mode.

At least one embodiment of the present disclosure also provides a touch input system, which includes a touch display screen and the active pen provided by any one of the embodiments of the present disclosure. The touch display screen comprises a plurality of touch electrodes, which are capacitive, and a touch drive circuit connected to the plurality of touch electrodes; the touch drive circuit is configured to charge the plurality of touch electrodes and detect capacitances of the plurality of touch electrodes; and the active pen is configured to receive the first coupling voltage between the active pen and a touch electrode, and to output the second coupling voltage to the touch electrode, and the polarity of the second coupling voltage is opposite to the polarity of the first coupling voltage.

For example, in the touch input system provided by an embodiment of the present disclosure, the touch drive circuit comprises a first switch circuit, a second switch circuit, a storage capacitor, and an operational amplification circuit; the operational amplification circuit is configured to charge the touch electrode through a first input terminal of the operational amplification circuit, so that a potential of the touch electrode is identical to a potential of the first input terminal, and is configured to feedback a change amount of a capacitance of the touch electrode to an output terminal of the operational amplification circuit; a first terminal of the first switch circuit is connected to the touch electrode, a second terminal of the first switch circuit is connected to a second input terminal of the operational amplification circuit, and the first switch circuit is configured to control the operational amplification circuit to be connected or disconnected to the touch electrode; a first electrode of the storage capacitor is connected to the second input terminal of the operational amplification circuit, and a second electrode of the storage capacitor is connected to the output terminal of the operational amplification circuit; and a first terminal of the second switch circuit is connected to the first electrode of the storage capacitor, a second terminal of the second switch circuit is connected to the second electrode of the storage capacitor, and the second switch circuit is configured to release charges stored in the storage capacitor in a case where the second switch circuit is turned on.

For example, in the touch input system provided by an embodiment of the present disclosure, the first switch circuit comprises a first transistor, a first electrode of the first transistor is connected to the touch electrode, and a second electrode of the first transistor is connected to the first electrode of the storage capacitor; the second switch circuit comprises a second transistor, a first electrode of the second transistor is connected to the first electrode of the storage capacitor, and a second electrode of the second transistor is connected to the second electrode of the storage capacitor; and the operational amplification circuit comprises an operational amplifier, a non-inverting input terminal of the operational amplifier serves as the first input terminal of the operational amplification circuit, an inverting input terminal of the operational amplifier serves as the second input terminal of the operational amplification circuit and is connected to the second electrode of the first transistor, and an output terminal of the operational amplifier serves as the output terminal of the operational amplification circuit and is connected to the second electrode of the storage capacitor.

For example, in the touch input system provided by an embodiment of the present disclosure, the touch display screen comprises an embedded touch display screen.

At least one embodiment of the present disclosure also provides a method for driving the active pen provided by any one of the embodiments of the present disclosure, which includes: receiving the first coupling voltage between the active pen and the touch display screen; processing the first coupling voltage to obtain the second coupling voltage, in which the polarity of the second coupling voltage is opposite to the polarity of the first coupling voltage; and transmitting the second coupling voltage to the touch display screen.

For example, the method provided by an embodiment of the present disclosure further includes: amplifying the second coupling voltage.

At least one embodiment of the present disclosure also provides a method for driving the touch input system provided by any one of the embodiments of the present disclosure, which includes: charging the plurality of touch electrodes by the touch drive circuit; receiving the first coupling voltage between the active pen and the touch electrode and outputting the second coupling voltage to the touch electrode, by the active pen, in which the polarity of the second coupling voltage is opposite to the polarity of the first coupling voltage; and detecting the capacitances of the plurality of touch electrodes by the touch drive circuit.

For example, the method provided by an embodiment of the present disclosure further includes: amplifying the second coupling voltage and outputting the second coupling voltage, which is amplified, to the touch electrode.

For example, the method provided by an embodiment of the present disclosure further includes: before the touch drive circuit charges the plurality of touch electrodes, releasing charges stored in a storage capacitor in the touch drive circuit.

For example, the method provided by an embodiment of the present disclosure further includes: turning on or turning off a power supply of the active pen, to switch the active pen between an active mode and a passive mode.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
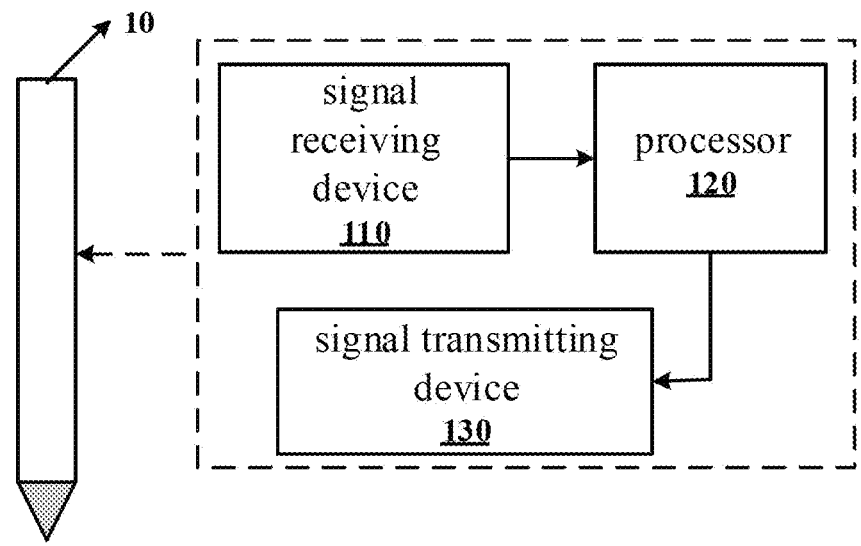
FIG. 1 is a schematic diagram of an active pen provided by some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

Touch pens used for a touch display screen comprise two types, i.e., passive pens and active pens. The function of the passive pen is equivalent to a human finger. In a case where the passive pen contacts the touch display screen, part of a current in the touch display screen flows into the passive pen from a touch point, which can be equivalent to a change of a capacitance of a touch electrode at the touch point. A touch chip of the touch display screen can determine a position of the touch point by detecting the change of the capacitance of the touch electrode. The active pen can actively transmit signals to change an electric field at the touch point, thereby changing the capacitance of the touch electrode at the touch point. The touch chip of the touch display screen can determine the position of the touch point by detecting the change of the capacitance of the touch electrode. When using a common active pen, an effective signal amount obtained during touch detection is insufficient, thus affecting and limiting the sensitivity of the touch detection.

At least one embodiment of the present disclosure provides an active pen for a touch display screen, and the active pen includes a signal receiving device, a processor which is in signal connection with the signal receiving device, and a signal transmitting device which is in signal connection with the processor. The signal receiving device is configured to receive a first coupling voltage between the active pen and the touch display screen; the processor is configured to process the first coupling voltage to obtain a second coupling voltage, and a polarity of the second coupling voltage is opposite to a polarity of the first coupling voltage; and the signal transmitting device is configured to transmit the second coupling voltage to the touch display screen.

At least one embodiment of the present disclosure also provides a touch input system corresponding to the active pen, a method for driving the active pen, and a method for driving the touch input system. The active pen, the touch input system, and the method provided by the embodiments of the present disclosure can improve the effective signal amount obtained in a case where the touch display screen performs the touch detection, thereby improving the sensitivity of the touch detection.

The embodiments of the present disclosure are described in detail below with reference to the accompanying drawings.

Some embodiments of the present disclosure provide an active pen 10 for a touch display screen. As illustrated in FIG. 1, the active pen 10 includes a signal receiving device 110, a processor 120 which is in signal connection with the signal receiving device 110, and a signal transmitting device 130 which is in signal connection with the processor 120.

For example, the signal receiving device 110 is configured to receive a first coupling voltage between the active pen 10 and the touch display screen. For example, in a case where the active pen 10 performs a touch operation (e.g., contacting or approaching) on a touch display screen including a plurality of capacitive touch electrodes, a coupling capacitance (referred to as Cpen) is formed between the active pen 10 and a touch electrode. It should be noted that in the embodiments of the present disclosure, the coupling voltage, which is between the active pen 10 and the touch electrode and is received by the active pen 10 through a coupling action of the coupling capacitor Cpen, is referred to as the first coupling voltage, and a voltage transmitted by the active pen 10 is referred to as a second coupling voltage, which are same as that in the following embodiments and are not described again.

For example, an output terminal of the signal receiving device 110 is electrically connected to an input terminal of the processor 120. The signal receiving device 110 transmits the first coupling voltage obtained to the processor 120, and the processor 120 is configured to process the first coupling voltage to obtain a second coupling voltage, and enable that a polarity of the second coupling voltage is opposite to a polarity of the first coupling voltage.

For example, in a case of processing the first coupling voltage, the processor 120 can change only the polarity of the first coupling voltage without changing an amplitude of the first coupling voltage, so that an amplitude of the second coupling voltage and the amplitude of the first coupling voltage are identical, but the second coupling voltage and the first coupling voltage are opposite in polarity. For example, the first coupling voltage is 2V, and the second coupling voltage obtained after processing by the processor 120 may be −2V.

For another example, in a case of processing the first coupling voltage, the processor 120 can also change the amplitude of the first coupling voltage, so that the amplitude of the second coupling voltage obtained and the amplitude of the first coupling voltage are different, and the second coupling voltage and the first coupling voltage have opposite polarities. For example, the amplitude of the second coupling voltage may be larger than the amplitude of the first coupling voltage. For example, the first coupling voltage is 2V, and the second coupling voltage obtained after processing by the processor 120 may be −3V. Of course, the embodiments of the present disclosure are not limited to this case, and the amplitude of the second coupling voltage may be smaller than the amplitude of the first coupling voltage, for example, the first coupling voltage is 2V, and the second coupling voltage obtained after processing by the processor 120 may be −1V, so long as the polarity of the first coupling voltage and the polarity of the second coupling voltage are opposite.

For example, an output terminal of the processor 120 is connected to an input terminal of the signal transmitting device 130, the processor 120 transmits the second coupling voltage, which is obtained, to the signal transmitting device 130, and the signal transmitting device 130 is configured to transmit the second coupling voltage to the touch display screen. For example, in a case where the active pen 10 is in contact with or adjacent to a touch electrode in the touch display screen, the signal transmitting device 130 may transmit the second coupling voltage to the touch electrode.

It should be noted that in the embodiments of the present disclosure, signal connection between two devices (or components) represents that signals can be transmitted between the two devices, that is, the term "signal connection" in the present disclosure represents connection modes that can transmit signals, which includes but is not limited to an electrical connection mode, an optical connection mode, a magnetic connection mode, etc. For example, as described above, the signal receiving device 110 may transmit the first coupling voltage, which is received, to the processor 120, and the processor 120 may transmit the second coupling voltage, which is obtained, to the signal transmitting device 130. For example, in a case of using the optical connection mode, the first coupling voltage may be converted into an optical signal firstly, and then be transmitted to the processor 120 through optical emission and optical reception, and the processor 120 decodes the optical signal and then performs subsequent processing.

In addition, it should be noted that in the embodiments of the present disclosure, the touch operation on the touch display screen by using the active pen 10 includes direct contact between the active pen 10 and the touch display screen, or the active pen 10 is adjacent to the touch display screen (e.g., not in direct contact), which is same as that in the following embodiments and is not described again.

In a case where the active pen 10 provided by the embodiments of the present disclosure is used for performing touch operation on the touch display screen, the signal receiving device 110 receives the first coupling voltage between the active pen 10 and the touch electrode in the touch display screen, the processor 120 processes the first coupling voltage to obtain the second coupling voltage, and then the signal transmitting device 130 transmits the second coupling voltage to the touch electrode. In this way, for example, in a case where the touch chip performs touch detection on the touch electrode, compared with the passive pen, the active pen 10 can improve the effective signal amount obtained during the touch detection, thereby improving the sensitivity of the touch detection.

Figure 2:
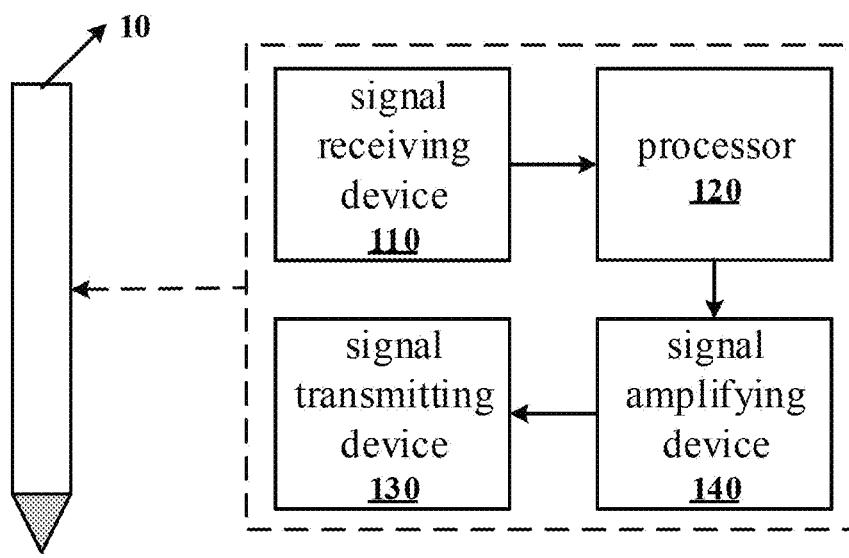
FIG. 2 is a schematic diagram of another active pen provided by some embodiments of the present disclosure.

For example, in the active pen 10 provided by some other embodiments of the present disclosure, as illustrated in FIG. 2, the active pen 10 further includes a signal amplifying device 140.

For example, the signal amplifying device 140 is in signal connection with the processor 120 and the signal transmitting device 130, and is configured to amplify the second coupling voltage and provide the second coupling voltage, which is amplified, to the signal transmitting device 130. For example, the signal amplifying device 140 is electrically connected to the processor 120 and the signal transmitting device 130. After obtaining the second coupling voltage, the processor 120 can transmit the second coupling voltage to the signal amplifying device 140 for amplification, and then the signal amplifying device 140 can provide the second coupling voltage, which is amplified, to the signal transmitting device 130. For example, the signal amplifying device 140 may adopt a circuit structure such as an amplifying circuit, and the embodiments of the present disclosure are not limited to this case.

In the active pen 10 provided by the embodiments of the present disclosure, the second coupling voltage can be further amplified by setting the signal amplifying device 140, so that the amplitude of the second coupling voltage becomes larger, and then the signal transmitting device 130 can transmit the second coupling voltage, which is amplified, to the touch electrode. In this way, for example, in a case where the touch chip performs touch detection on the touch electrode, the effective signal amount obtained by the touch detection can be further increased, so that the sensitivity of the touch detection can be further improved.

Figure 3:
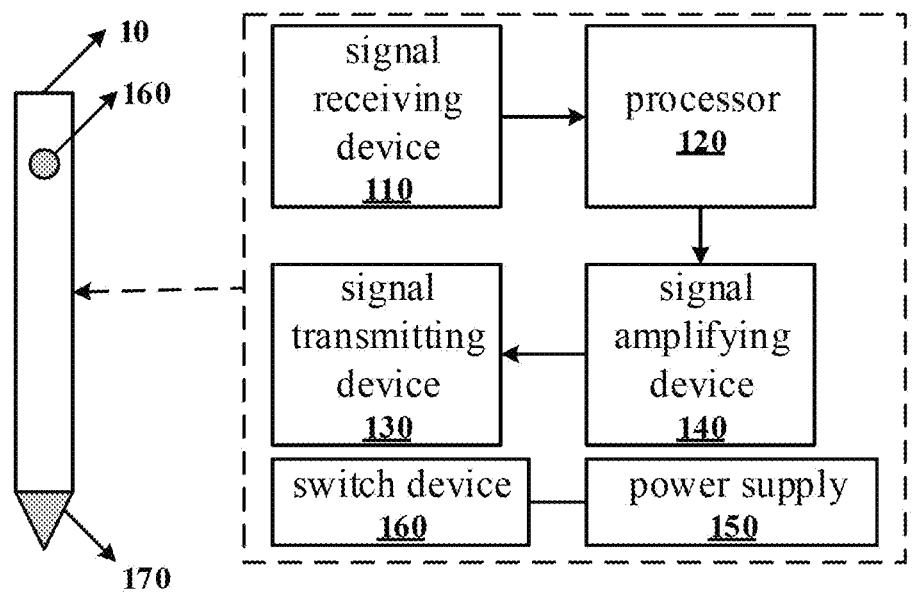
FIG. 3 is a schematic diagram of still another active pen provided by some embodiments of the present disclosure.

For example, in the active pen 10 provided by some embodiments of the present disclosure, as illustrated in FIG. 3, the active pen 10 further includes a power supply 150 and a switch device 160.

The power supply 150 is configured to provide electric energy to the active pen 10. For example, the power supply 150 is electrically connected to the signal receiving device 110, the processor 120, the signal amplifying device 140, and the signal transmitting device 130 in the active pen 10, so that the electric energy can be supplied to these components. For example, the power supply 150 may include a built-in battery or may include a battery compartment for easily replacing the battery; and the battery may be a primary battery or a secondary battery, and the secondary battery may be a lithium ion battery or the like. For another example, the power supply 150 may also include a solar cell or the like.

For example, the switch device 160 is configured to turn on or turn off the power supply 150, so that the active pen 10 can switch between an active mode and a passive mode. For example, the switch device 160 is electrically connected to the power supply 150, so that the power supply 150 can be controlled. For example, in an example, as illustrated in FIG. 3, the switch device 160 may be on a housing of the active pen 10 and implemented as a circular mechanical key, so that the user can easily press the circular mechanical key. It should be noted that the embodiments of the present disclosure do not limit the setting position and the shape of the switch device 160, as long as the user can conveniently contact the switch device 160. For example, in addition to the mechanical key, the switch device 160 may include a non-mechanical key, and for example, the non-mechanical key includes a photoelectric key or a capacitive key, etc.

In the embodiments of the present disclosure, in a case where the active pen 10 is used for performing the touch operation, if the power supply 150 of the active pen 10 is in a turn-off state, the operation mode of the active pen 10 at this time is referred to as the passive mode. In a case where the active pen 10 works in the passive mode, it is equivalent to a human finger and cannot actively transmit signals. If the power supply 150 of the active pen 10 is in a turn-on state, the operation mode of the active pen 10 at this time is referred to as the active mode. In a case where the active pen 10 is in the active mode, it can not only receive signals, but also transmit signals, such as transmit the second coupling voltage to the touch electrode.

In the active pen 10 provided by some embodiments of the present disclosure, the active pen 10 can be switched between the passive mode and the active mode by setting the switch device 160. Therefore, in an application scenario where the active pen 10 is not used or the active mode is not required, the switch device 160 can be operated to turn off the power supply 150, thereby reducing power consumption.

For example, as illustrated in FIG. 3, the active pen 10 may further include a nib 170, which is conductive, and the nib 170 is configured to transmit the first coupling voltage and the second coupling voltage. For example, the nib 170 is electrically connected to the signal receiving device 110 and the signal transmitting device 130, so that the first coupling voltage and the second coupling voltage can be transmitted.

For example, a front portion (head) of the nib 170 may adopt a hemispherical shape to avoid damage to the touch display screen in a case where the nib 170 contacts the touch display screen. In a case where the active pen 10 is used, the nib 170 of the active pen 10 needs to frequently rub against a surface of the touch display screen, so the nib 170 can be coated with materials of good wear resistance, such as polyethylene terephthalate (PET) and the like.

In some other embodiments, the active pen 10 may also include one or more additional components, such as pressure sensors, motion/orientation sensors, accelerometers, touch sensors, rotation sensors, cameras, light emitters, color sensors, etc. By adopting one or more additional components, the active pen 10 can collect information, such as pressure, orientation, rotation information and the like, which are sensed at the nib 170 of the active pen 10. For example, the active pen 10 can convert the information into electrical signals, and transmit the electrical signals to the touch display screen when performing touch operations. For example, the touch chip in the touch display screen can further process the electrical signals to obtain the required information, and then convert the information into corresponding operations, such as adjusting the width of lines displayed, etc.

It should be noted that, in the embodiments of the present disclosure, the signal receiving device 110, the signal transmitting device 130, the signal amplifying device 140 in the active pen 10 can be implemented as appropriate circuits, chips, hardware or firmware, and the embodiments of the present disclosure are not limited to this case.

Figure 4:
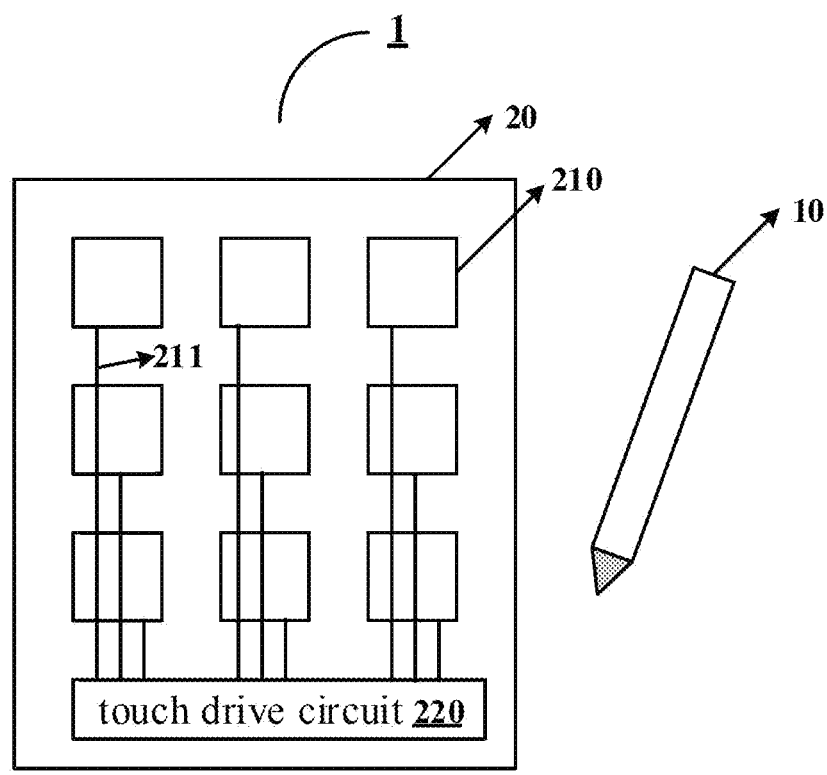
FIG. 4 is a schematic diagram of a touch input system provided by some embodiments of the present disclosure.

Some embodiments of the present disclosure also provide a touch input system 1. As illustrated in FIG. 4, the touch input system 1 includes a touch display screen 20 and the active pen 10 provided by the embodiments of the present disclosure. For example, the touch display screen 20 includes a plurality of touch electrodes 210, which are capacitive and arranged in parallel at predetermined positions, and the touch display screen 20 further include a touch drive circuit 220 which is connected to the plurality of touch electrodes 210. The touch drive circuit 220 is configured to charge the plurality of touch electrodes 210 and detect capacitances of the plurality of touch electrodes 210. The active pen 10 is configured to receive the first coupling voltage between the active pen 10 and the touch electrode 210, and output the second coupling voltage to the touch electrode 210. The polarity of the second coupling voltage is opposite to the polarity of the first coupling voltage.

For example, as illustrated in FIG. 4, each touch electrode 210 can be electrically connected to the touch drive circuit 220 via a touch wire 211. For example, in the example as illustrated in FIG. 4, the touch electrode 210 is a self-capacitance-type touch electrode. Of course, the embodiments of the present disclosure are not limited to this case. In other examples, the touch electrode 210 may be a mutual-capacitance-type touch electrode. For example, in a case of driving the touch electrode 210, the touch drive circuit 220 may charge it firstly. After the charging is completed, the active pen 10 can receive the first coupling voltage and transmit the second coupling voltage to the touch electrode 210 during the touch operation. Then, the touch drive circuit 220 can detect the capacitance of the touch electrode 210, for example, convert the variation of the capacitance of the touch electrode 210 into a voltage variation, thereby realizing the touch detection. The operation principle of the touch input system 1 is described in detail below and is not described here again.

Figure 5:
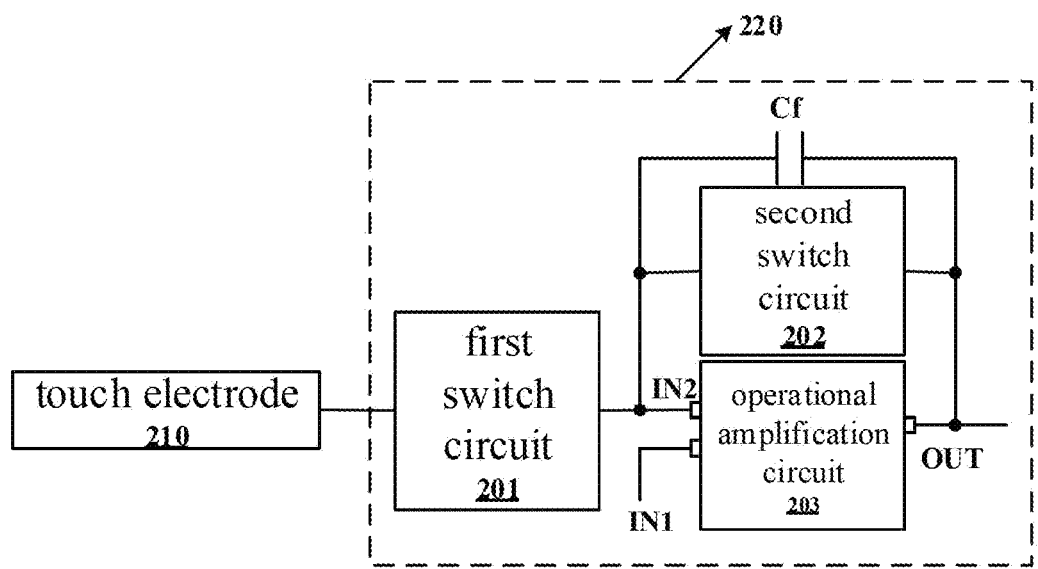
FIG. 5 is a schematic diagram of a touch drive circuit in a touch input system provided by some embodiments of the present disclosure.

For example, in some embodiments, as illustrated in FIG. 5, the touch drive circuit 220 includes a first switch circuit 201, a second switch circuit 202, a storage capacitor Cf, and an operational amplification circuit 203.

For example, the operational amplification circuit 203 is configured to charge the touch electrode 210 through a first input terminal IN1 of the operational amplification circuit, such that a potential of the touch electrode 210 is identical to a potential of the first input terminal IN1, and is configured to feed back a change amount of the capacitance of the touch electrode 210 to an output terminal OUT of the operational amplification circuit 203. For example, the operational amplification circuit 203 can convert the change in capacitance of the touch electrode 210 into the change in potential of the output terminal OUT of the operational amplification circuit 203, thereby realizing the touch detection by detecting the change in potential of the output terminal OUT of the operational amplification circuit 203.

For example, a first terminal of the first switch circuit 201 is connected to the touch electrode 210, a second terminal of the first switch circuit 201 is connected to an second input terminal IN2 of the operational amplification circuit 203, and the first switch circuit 201 is configured to control the operational amplification circuit 203 to be connected or disconnected to the touch electrode 210. For example, in a case where the touch drive circuit 220 needs to charge the touch electrode 210, the first switch circuit 201 is conductive (turned on), so that the touch drive circuit 220 is electrically connected to the touch electrode 210. For another example, in a case where the storage capacitor Cf releases electric charges, which are stored in the storage capacitor, the first switch circuit 201 is turned off.

For example, a first electrode of the storage capacitor Cf is connected to the second input terminal IN2 of the operational amplification circuit 203, and a second electrode of the storage capacitor Cf is connected to the output terminal OUT of the operational amplification circuit 203.

For example, a first terminal of the second switch circuit 202 is connected to the first electrode of the storage capacitor Cf, a second terminal of the second switch circuit 202 is connected to the second electrode of the storage capacitor Cf, and the second switch circuit 202 is configured to release the charges stored in the storage capacitor Cf in a case where the second switch circuit 202 is conductive (turned on). For example, in a case where the second switch circuit 202 is turned on, the first electrode of the storage capacitor Cf and the second electrode of the storage capacitor Cf are shorted, and there is no potential difference between the first electrode of the storage capacitor Cf and the second electrode of the storage capacitor Cf, so that the charges, which are stored in the storage capacitor Cf, can be released. For example, before the touch drive circuit 220 charges the touch electrode 210, the second switch circuit 202 is turned on to release the charges of the storage capacitor Cf.

Figure 6:
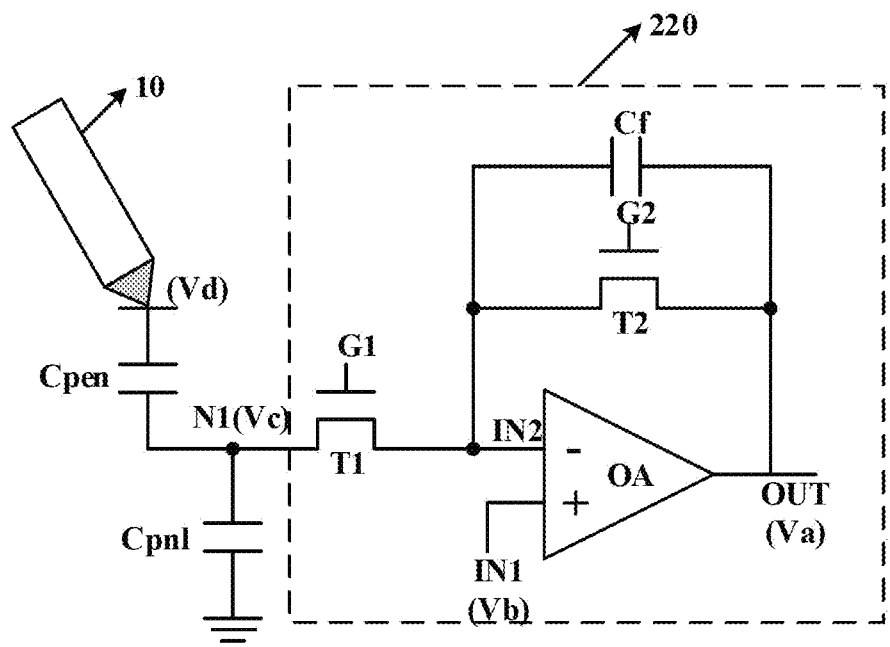
FIG. 6 is a circuit structure diagram of a touch input system provided by some embodiments of the present disclosure.

For example, in some embodiments, the touch drive circuit 220 illustrated in FIG. 5 may be implemented as a circuit structure which is illustrated in a dashed box in FIG. 6, or may be implemented as other circuit structures with the same or similar functions, which are not limited herein.

As illustrated in FIG. 6, in more detail, the first switch circuit 201 can be implemented as a first transistor T1, a first electrode of the first transistor T1 is connected to the touch electrode 210, and a second electrode of the first transistor T1 is connected to the first electrode of the storage capacitor Cf. For example, a gate electrode G1 of the first transistor T1 may receive a control signal to turn on or turn off the first transistor T1. It should be noted that in other embodiments, the first switch circuit 201 can also be implemented as a single-pole single-throw switch or other suitable elements, and the embodiments of the present disclosure are not limited to this case.

It should be noted that the touch electrode 210 is not illustrated in FIG. 6, but the junction where the first transistor T1 and the touch electrode 210 are connected is identified as a first node N1. In addition, a self-capacitance formed between the touch electrode 210 and the ground is equivalent to Cpnl, and a coupling capacitance formed between the touch electrode 210 and the active pen 10 is equivalent to Cpen. It should be noted that in FIG. 6, the storage capacitor Cf is a real capacitive device, while the capacitors Cpnl and Cpen are equivalent capacitors and are not real capacitive devices.

The second switch circuit 202 may be implemented as a second transistor T2, a first electrode of the second transistor T2 is connected to the first electrode of the storage capacitor Cf, and a second electrode of the second transistor T2 is connected to the second electrode of the storage capacitor Cf. For example, a gate electrode G2 of the second transistor T2 may receive a control signal to turn on or turn off the second transistor T2, which is different from the control signal applied to the gate electrode G1 of the first transistor T1. It should be noted that in other embodiments, the second switch circuit 202 can also be implemented as a single-pole single-throw switch or other suitable elements, and the embodiments of the present disclosure are not limited to this case.

The operational amplification circuit 203 may be implemented as an operational amplifier OA, a non-inverting input terminal of the operational amplifier OA serves as the first input terminal IN1 of the operational amplification circuit 203, an inverting input terminal of the operational amplifier OA serves as the second input terminal IN2 of the operational amplification circuit 203 and is connected to the second electrode of the first transistor T1, and an output terminal of the operational amplifier OA serves as the output terminal OUT of the operational amplification circuit 203 and is connected to the second electrode of the storage capacitor Cf.

In the touch input system 1 provided by the embodiments of the present disclosure, the touch display screen 20 can adopt an embedded touch display screen, so that the active pen 10 can be used to implement the touch operation on the embedded touch display screen.

It should be noted that the transistors used in the embodiments of the present disclosure may all be thin film transistors or field effect transistors or other switching devices with the same characteristics. A source electrode of the transistor and a drain electrode of the transistor used here can be symmetrical in structure, so the source electrode of the transistor and the drain electrode of the transistor can be structurally indistinguishable. In the embodiments of the present disclosure, in order to distinguish the two electrodes of the transistor except the gate electrode, one of the two electrodes is referred to as a first electrode, and the other is referred to as a second electrode. The first electrode and the second electrode of all or part of the transistors in the embodiments of the present disclosure are interchangeable as required. For example, the first electrode of the transistor described in the embodiments of the present disclosure may be the source electrode and the second electrode of the transistor may be the drain electrode; and alternatively, the first electrode of the transistor may be the drain electrode and the second electrode of the transistor may be the source electrode.

In addition, transistors can be divided into N-type transistors and P-type transistors according to their characteristics. In a case where the transistor is a P-type transistor, a turn-on voltage is a low-level voltage (e.g., 0V, −5V, −10V or other suitable voltages), and a turn-off voltage is a high-level voltage (e.g., 5V, 10V or other suitable voltages); and in a case where the transistor is an N-type transistor, a turn-on voltage is a high-level voltage (e.g., 5V, 10V or other suitable voltages), and a turn-off voltage is a low-level voltage (e.g., 0V, −5V, −10V or other suitable voltages). The transistors in the embodiments of the present disclosure are all described by taking N-type transistors as an example. Based on the description and teaching of the implementations in the present disclosure, those skilled in the art can easily understand that the embodiments of the present disclosure can also adopt implementations of P-type transistors or combinations of N-type and P-type transistors without creative labor. Therefore, these implementations are also within the protection scope of the present disclosure.

It should be noted that, for clarity of description, in FIG. 6, a potential of the output terminal OUT of the operational amplifier OA is identified as Va, a potential of the non-inverting input terminal (IN1) of the operational amplifier OA is identified as Vb, a potential of the first node N1 (i.e., the touch electrode 210) is identified as Vc, and a potential at the nib of the active pen 10 (i.e., the second coupling voltage transmitted by the active pen 10) is identified as Vd.

Figure 7:
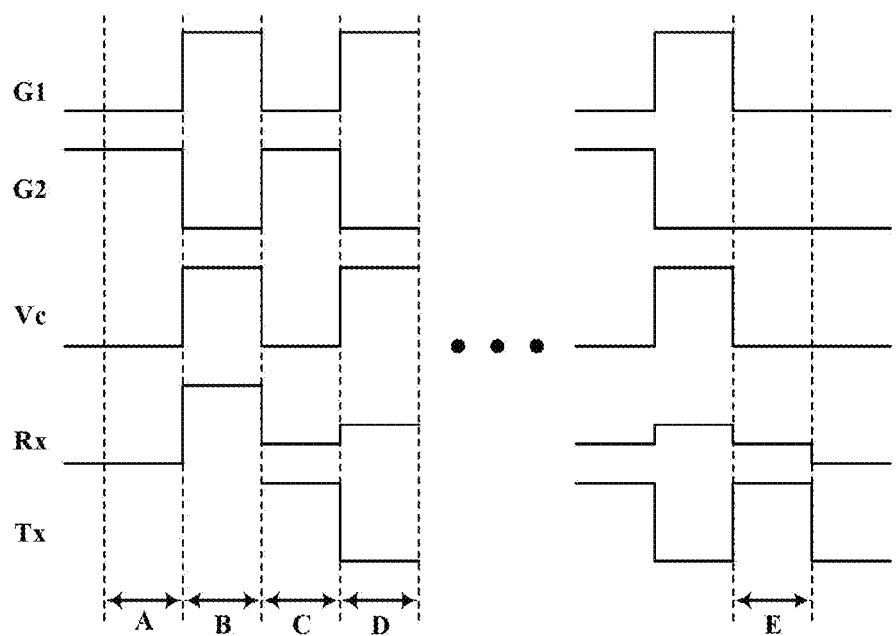
FIG. 7 is a signal timing diagram for the touch input system as illustrated in FIG. 6.

FIG. 7 is a signal timing diagram for the circuit structure as illustrated in FIG. 6 during operation. An operation process of the touch input system 1 provided by the embodiments of the present disclosure is described below with reference to the signal timing diagram as illustrated in FIG. 7, by taking the circuit structure illustrated in FIG. 6 as an example. In the following description, it is described by taking a case that both the first transistor T1 and the second transistor T2 are N-type transistors as an example. In FIG. 7, G1 and G2 are low levels to represent that the corresponding transistors are turned off, G1 and G2 are high levels to represent that the corresponding transistors are turned on, Rx represents the first coupling voltage received by the signal receiving device 110 in the active pen 10, Tx represents whether the signal transmitting device 130 in the active pen 10 is turned on or not, Tx with a high level represents that the signal transmitting device 130 is turned on, and Tx with a low level represents that the signal transmitting device 130 is turned off.

As illustrated in FIG. 7, in a phase A, because G1 is at a low level and G2 is at a high level, the first transistor T1 is turned off and the second transistor T2 is turned on. During this phase, because the second transistor T2 is turned on, the storage capacitor Cf releases the charges, which are stored in the storage capacitor Cf. The purpose of emptying the charges stored in the storage capacitor Cf is to implement better charging and realize the corresponding functions of the operational amplifier OA in subsequent phases.

In a phase B, because G1 is at a high level and G2 is at a low level, the first transistor T1 is turned on and the second transistor T2 is turned off. During this phase, the touch electrode 210 (i.e., the first node N1) is charged through the non-inverting input terminal of the operational amplifier OA, and the potential Vc of the first node N1 changes from 0 to Vb (i.e., equal to the potential of the non-inverting input terminal of the operational amplifier OA) after the charging is completed. For example, due to the virtual short effect of the operational amplifier OA, the potential of the inverting input terminal is equal to the potential of the non-inverting input terminal, and the first node N1 is connected to the inverting input terminal of the operational amplifier OA through the first transistor T1, so that the function of charging the first node N1 can be realized. Meanwhile, in a case where the active pen 10 performs the touch operation during this phase, a coupling capacitance Cpen can be formed between the active pen 10 and the touch electrode 210, which is equivalent to the change in capacitance of the touch electrode 210, and the capacitance Cpen is superimposed on the capacitance Cpnl between the touch electrode 210 and the ground. According to the principle of charge conservation, through the functions of the operational amplifier OA and the storage capacitor Cf, the change of the capacitance of the touch electrode 210 can be converted into the change of the potential Va of the output terminal OUT of the operational amplifier OA, and therefore, whether a touch operation is performed can be determined by detecting the change of the potential Va of the output terminal OUT of the operational amplifier OA.

It should be noted that in the phase B, the active pen 10 can receive the first coupling voltage and process the first coupling voltage to obtain the second coupling voltage, but the active pen 10 does not transmit the second coupling voltage in this phase.

According to the principle of charge conservation, formula (1) can be obtained as follows:

$$Cf*(Vb-Va)+Vc*Cpnl+(Vc-Vd)*Cpen=0 \quad (1)$$

In a case where the active pen 10 does not perform the touch operation (i.e., the active pen 10 is not in contact with or not adjacent to the touch electrode 210) and the active pen 10 does not transmit the second coupling voltage, the active pen 10 does not form the coupling capacitance Cpen with the touch electrode 210, i.e., Cpen. At this time, the potential of the output terminal OUT of the operational amplifier OA is denoted as Va1, and Cpen is substituted into the formula (1) to obtain the equation, i.e., $Cf*(Vb-Va1)+Vc*Cpnl=0$, and Va1 is calculated as Va1=Vc*Cpnl/Cf+Vb.

In a case where the active pen 10 performs the touch operation (i.e., the active pen 10 is in direct contact with or adjacent to the touch electrode 210) and the active pen 10 does not transmit the second coupling voltage, Cpen is not equal to 0, but Vd is equal to 0. At this time, the potential of the output terminal OUT of the operational amplifier OA is denoted as Va2, and Vd=0 is substituted into the formula (1) to obtain the equation, i.e., $Cf*(Vb-Va)+Vc*Cpnl+Vc*Cpen$, and Va2 is calculated as Va2=Vc*Cpnl/Cf+Vb+Vc*Cpen/Cf.

According to the above analysis, it can be seen that in a case where the active pen 10 does not transmit the second coupling voltage during touch operation, the effective signal amount detected by the output terminal OUT of the operational amplifier OA is illustrated in formula (2):

$$\Delta V1=Va2-Va1=Vc*Cpen/Cf \quad (2)$$

In the formula (2), in a case where Cf and Cpen remain unchanged, the effective signal amount ΔV1 is related to a value of Vc, and according to the above analysis, it can be seen that the value of Vc is equal to Vb after charging is completed, so the value of the effective signal amount ΔV1 is related to an value of Vb. In order to increase the effective signal amount, the value of Vb is needed to be increased, but the increase of Vb may increase a noise.

In a phase C, the first transistor T1 is turned off and the second transistor T2 is turned on. In the same way as in the phase A, the storage capacitor Cf releases the charges, which are stored in the storage capacitor Cf, in this phase. Meanwhile, during this phase, the signal transmitting device 130 in the active pen 10 is turned on, and the active pen 10 can transmit the second coupling voltage.

In a phase D, the first transistor T1 is turned on and the second transistor T2 is turned off. In the same way as in the phase B, the touch electrode 210 (i.e., the first node N1) is charged through the non-inverting input terminal of the operational amplifier OA during this phase. After the charging is completed, the potential Vc of the first node N1 changes from 0 to Vb (i.e., equal to the potential of the non-inverting input terminal of the operational amplifier OA).

In a case where the active pen 10 performs the touch operation (i.e., the active pen 10 is in direct contact with or adjacent to the touch electrode 210) and the active pen 10 transmits the second coupling voltage, neither Cpen nor Vd is equal to 0. At this time, the potential of the output terminal OUT of the operational amplifier OA is denoted as Va3, which is substituted into the formula (1) to obtain the equation, i.e., Cf*(Vb−Va)+Vc*Cpnl+(Vc−Vd)*Cpen. Va3 is obtained through calculation, and Va3=Vc*Cpnl/Cf+Vb+(Vc−Vd)*Cpen/Cf.

According to the above analysis, it can be seen that in a case where the active pen 10 transmits the second coupling voltage during the touch operation, the effective signal amount detected by the output terminal OUT of the operational amplifier OA is illustrated in formula (3):

$$\Delta V2 = Va3 - Va1 = (Vc - Vd) * Cpen/Cf \quad (3)$$

For example, in a case where the first coupling voltage received by the active pen 10 is Vc, after processing by the active pen 10, for example, only changing the polarity without amplifying the signal, the second coupling voltage Vd, which is transmitted, satisfies equation Vd=−Vc, and Vd=−Vc is substituted into formula (3) to obtain the equation $\Delta V2 = 2Vc*Cpen/Cf$. $\Delta V2$ is doubled compared with the effective signal amount $\Delta V1$ in formula (2). In formula (3), because the polarity of Vd is opposite to the polarity of Vc, the larger the amplitude of Vd, the larger the effective signal amount $\Delta V2$. For example, in a case where the active pen 10 processes the first coupling voltage, which is received, the active pen 10 can also amplify the signal to increase the amplitude of the second coupling voltage Vd, which is transmitted, thereby further increasing the effective signal amount obtained during the touch detection and improving the sensitivity of the touch detection.

As illustrated in FIG. 7, in a phase E, because G1 and G2 are both at low levels, both the first transistor T1 and the second transistor T2 are turned off. During this phase, Vc does not change, and the active pen 10 does not receive the first coupling voltage. Although Tx is at a high level, the active pen 10 does not transmit the second coupling voltage. In following phases, the active pen 10 stops working and the touch scanning ends.

In the touch input system 1 provided by the embodiments of the present disclosure, by adopting the active pen 10 provided by the embodiments of the present disclosure, in a case where the active pen 10 performs the touch operation, a signal (e.g., the second coupling voltage) can be actively transmitted to the touch electrode 210, so that the effective signal amount obtained during the touch detection is increased, thereby improving the sensitivity of the touch detection.

The embodiments of the present disclosure also provide a method, which can be used to drive the active pen 10 provided by any one of the embodiments of the present disclosure. For example, the method includes following operations.

Step S10: receiving the first coupling voltage between the active pen and the touch display screen;

step S20: processing the first coupling voltage to obtain the second coupling voltage, in which the polarity of the second coupling voltage is opposite to the polarity of the first coupling voltage; and step S30: transmitting the second coupling voltage to the touch display screen.

For example, in some embodiments, the above method further includes following operations.

Step S40: amplifying the second coupling voltage.

For example, step S40 may be performed before step S30 is performed, so that the amplitude of the second coupling voltage becomes larger.

It should be noted that the detailed description and technical effects of the method can be referred to the description of the active pen 10 in the embodiments of the present disclosure and are not described here again.

The embodiments of the present disclosure also provide a method, which can be used to drive the touch input system 1 provided by any one of the embodiments of the present disclosure. For example, the method includes following operations.

Step S100: charging the plurality of touch electrodes 210 by the touch drive circuit 220;

step S200: receiving the first coupling voltage between the active pen 10 and the touch electrode 210 and outputting the second coupling voltage to the touch electrode 210, by the active pen 10, in which the polarity of the second coupling voltage is opposite to the polarity of the first coupling voltage; and step S300: detecting the capacitances of the plurality of touch electrodes 210 by the touch drive circuit 220.

For example, the touch drive circuit 220 can convert the detected change amount of the capacitance of the touch electrode 210 into the change amount of the potential at the output terminal OUT of the operational amplifier circuit 203, thereby realizing the touch detection by detecting the change amount of the potential at the output terminal OUT of the operational amplifier circuit 203. Meanwhile, because the active pen 10 can actively transmit a signal (e.g., the second coupling voltage) to the touch electrode 210, the effective signal amount during the touch detection can be increased, thereby improving the sensitivity of the touch detection.

For example, the above method further includes following operations.

Step S400: amplifying the second coupling voltage and outputting the second coupling voltage, which is amplified, to the touch electrode 210.

For example, step S400 may be performed before step S300 is performed. By amplifying the second coupling voltage, the effective signal amount during the touch detection can be further increased, thus the sensitivity during the touch detection can be further improved.

For example, the above method may further include following operations.

Step S500: before the touch drive circuit 220 charges the plurality of touch electrodes 210, releasing charges stored in a storage capacitor Cf in the touch drive circuit 220.

For example, step S500 may be performed before step S100 is performed. By emptying the charges stored in the storage capacitor Cf, charging can be better performed and the corresponding functions of the operational amplifier OA can be implemented in subsequent phases.

For example, in some embodiments, the above method may further include following operations.

Step S600: turning on or turning off a power supply 150 of the active pen 10, to switch the active pen 10 between an active mode and a passive mode.

In a case where the operation mode of the active pen 10 needs to be switched, for example, needs to be switched from the passive mode to the active mode, the power supply 150 of the active pen 10 can be turned on; and for example, in a case where the operation mode of the active pen 10 needs to be switched from the active mode to the passive mode, the power supply 150 of the active pen 10 may be turned off.

It should be noted that the detailed description and technical effects of the method can be referred to the description of the touch input system 1 in the embodiments of the present disclosure, and are not described here again.

In various embodiments of the present disclosure, the processor 120 may be implemented by a general-purpose integrated circuit chip or an application-specific integrated circuit chip, for example, the integrated circuit chip may be disposed on a motherboard, and for example, a memory, a power supply circuit, etc., may also be disposed on the motherboard. In addition, the processor 120 may also be implemented by a circuit or by software, hardware (circuit), firmware, or any combinations thereof. In the embodiments of the present disclosure, the processor 120 may include various computing structures, such as a complex instruction set computer (CISC) structure, a reduced instruction set computer (RISC) structure, or a structure that implements a combination of multiple instruction sets. In some embodiments, the processor 120 may also be a central processor, a microprocessor, such as an X86 processor, an ARM processor, or may be a digital processor (DSP), etc.

What have been described above merely are exemplary embodiments of the present disclosure, and not intended to define the scope of the present disclosure, and the scope of the present disclosure is determined by the appended claims.

What is claimed is:

1. An active pen for a touch display screen, comprising:
a signal receiving device,
a processor, in signal connection with the signal receiving device, and
a signal transmitting device, in signal connection with the processor,
wherein the signal receiving device is configured to receive a first coupling voltage between the active pen and the touch display screen;
the processor is configured to process the first coupling voltage to obtain a second coupling voltage, and a polarity of the second coupling voltage is opposite to a polarity of the first coupling voltage; and
the signal transmitting device is configured to transmit the second coupling voltage to the touch display screen;
a relationship between an amplitude of the second coupling voltage and an amplitude of the first coupling voltage is adjustable.

2. The active pen according to claim 1, further comprising a signal amplifying device, wherein the signal amplifying device is in signal connection with the processor and the signal transmitting device, and is configured to amplify the second coupling voltage and provide the second coupling voltage, which is amplified, to the signal transmitting device.

3. The active pen according to claim 2, further comprising a nib which is conductive, wherein the nib is configured to transmit the first coupling voltage and the second coupling voltage.

4. The active pen according to claim 2, further comprising a power supply and a switch device,
wherein the switch device is configured to turn on or turn off the power supply, so that the active pen switches between an active mode and a passive mode;
the power supply is configured to provide electric energy to the active pen;
in a case where the switch device turns on the power supply so that the power supply provides the electric energy, the active pen is in the active mode; and
in a case where the switch device turns off the power supply so that the power supply does not provide the electric energy, the active pen is in the passive mode.

5. A touch input system, comprising a touch display screen and the active pen according to claim 2,
wherein the touch display screen comprises a plurality of touch electrodes, which are capacitive, and a touch drive circuit connected to the plurality of touch electrodes;
the touch drive circuit is configured to charge the plurality of touch electrodes and detect capacitances of the plurality of touch electrodes; and
the active pen is configured to receive the first coupling voltage between the active pen and a touch electrode, and to output the second coupling voltage to the touch electrode, and the polarity of the second coupling voltage is opposite to the polarity of the first coupling voltage.

6. The active pen according to claim 1, further comprising a nib which is conductive, wherein the nib is configured to transmit the first coupling voltage and the second coupling voltage.

7. The active pen according to claim 6, further comprising a power supply and a switch device,
wherein the switch device is configured to turn on or turn off the power supply, so that the active pen switches between an active mode and a passive mode;
the power supply is configured to provide electric energy to the active pen;
in a case where the switch device turns on the power supply so that the power supply provides the electric energy, the active pen is in the active mode; and
in a case where the switch device turns off the power supply so that the power supply does not provide the electric energy, the active pen is in the passive mode.

8. A touch input system, comprising a touch display screen and the active pen according to claim 6,
wherein the touch display screen comprises a plurality of touch electrodes, which are capacitive, and a touch drive circuit connected to the plurality of touch electrodes;
the touch drive circuit is configured to charge the plurality of touch electrodes and detect capacitances of the plurality of touch electrodes; and
the active pen is configured to receive the first coupling voltage between the active pen and a touch electrode, and to output the second coupling voltage to the touch electrode, and the polarity of the second coupling voltage is opposite to the polarity of the first coupling voltage.

9. The active pen according to claim 1, further comprising a power supply and a switch device, wherein the switch device is configured to turn on or turn off the power supply, so that the active pen switches between an active mode and a passive mode;

the power supply is configured to provide electric energy to the active pen;

in a case where the switch device turns on the power supply so that the power supply provides the electric energy, the active pen is in the active mode; and in a case where the switch device turns off the power supply so that the power supply does not provide the electric energy, the active pen is in the passive mode.

10. A touch input system, comprising a touch display screen and the active pen according to claim 9, wherein the touch display screen comprises a plurality of touch electrodes, which are capacitive, and a touch drive circuit connected to the plurality of touch electrodes;

the touch drive circuit is configured to charge the plurality of touch electrodes and detect capacitances of the plurality of touch electrodes; and the active pen is configured to receive the first coupling voltage between the active pen and a touch electrode, and to output the second coupling voltage to the touch electrode, and the polarity of the second coupling voltage is opposite to the polarity of the first coupling voltage.

11. A touch input system, comprising a touch display screen and the active pen according to claim 1, wherein the touch display screen comprises a plurality of touch electrodes, which are capacitive, and a touch drive circuit connected to the plurality of touch electrodes;

the touch drive circuit is configured to charge the plurality of touch electrodes and detect capacitances of the plurality of touch electrodes; and the active pen is configured to receive the first coupling voltage between the active pen and a touch electrode, and to output the second coupling voltage to the touch electrode, and the polarity of the second coupling voltage is opposite to the polarity of the first coupling voltage.

12. The touch input system according to claim 11, wherein the touch drive circuit comprises a first switch circuit, a second switch circuit, a storage capacitor, and an operational amplification circuit;

the operational amplification circuit is configured to charge the touch electrode through a first input terminal of the operational amplification circuit, so that a potential of the touch electrode is identical to a potential of the first input terminal, and is configured to feedback a change amount of a capacitance of the touch electrode to an output terminal of the operational amplification circuit;

a first terminal of the first switch circuit is connected to the touch electrode, a second terminal of the first switch circuit is connected to a second input terminal of the operational amplification circuit, and the first switch circuit is configured to control the operational amplification circuit to be connected or disconnected to the touch electrode;

a first electrode of the storage capacitor is connected to the second input terminal of the operational amplification circuit, and a second electrode of the storage capacitor is connected to the output terminal of the operational amplification circuit; and a first terminal of the second switch circuit is connected to the first electrode of the storage capacitor, a second terminal of the second switch circuit is connected to the second electrode of the storage capacitor, and the second switch circuit is configured to release charges stored in the storage capacitor in a case where the second switch circuit is turned on.

13. The touch input system according to claim 12, wherein the first switch circuit comprises a first transistor, a first electrode of the first transistor is connected to the touch electrode, and a second electrode of the first transistor is connected to the first electrode of the storage capacitor;

the second switch circuit comprises a second transistor, a first electrode of the second transistor is connected to the first electrode of the storage capacitor, and a second electrode of the second transistor is connected to the second electrode of the storage capacitor; and the operational amplification circuit comprises an operational amplifier, a non-inverting input terminal of the operational amplifier serves as the first input terminal of the operational amplification circuit, an inverting input terminal of the operational amplifier serves as the second input terminal of the operational amplification circuit and is connected to the second electrode of the first transistor, and an output terminal of the operational amplifier serves as the output terminal of the operational amplification circuit and is connected to the second electrode of the storage capacitor.

14. The touch input system according to claim 11, wherein the touch display screen comprises an embedded touch display screen.

15. A method for driving the touch input system according to claim 11, comprising:

charging the plurality of touch electrodes by the touch drive circuit;

receiving the first coupling voltage between the active pen and the touch electrode and outputting the second coupling voltage to the touch electrode, by the active pen, wherein the polarity of the second coupling voltage is opposite to the polarity of the first coupling voltage; and detecting the capacitances of the plurality of touch electrodes by the touch drive circuit.

16. The method according to claim 15, further comprising:

amplifying the second coupling voltage and outputting the second coupling voltage, which is amplified, to the touch electrode.

17. The method according to claim 15, further comprising:

before the touch drive circuit charges the plurality of touch electrodes, releasing charges stored in a storage capacitor in the touch drive circuit.

18. The method according to claim 15, further comprising:

turning on or turning off a power supply of the active pen, to switch the active pen between an active mode and a passive mode.

19. A method for driving the active pen according to claim 1, comprising:

receiving the first coupling voltage between the active pen and the touch display screen;

processing the first coupling voltage to obtain the second coupling voltage, wherein the polarity of the second coupling voltage is opposite to the polarity of the first coupling voltage; and transmitting the second coupling voltage to the touch display screen.

20. The method according to claim 19, further comprising:
   amplifying the second coupling voltage.

\* \* \* \* \*